United States Patent
Baidya et al.

(10) Patent No.: US 12,354,214 B2
(45) Date of Patent: Jul. 8, 2025

(54) DIGITAL IMAGE EDITING USING A DEPTH-AWARE SYSTEM

(71) Applicant: Adobe Inc., San Jose, CA (US)

(72) Inventors: Rakesh Baidya, Delhi (IN); Praveen Kumar Dhanuka, Howrah (IN); Nitin Sharma, Gurugram (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/169,882

(22) Filed: Feb. 8, 2021

(65) Prior Publication Data
US 2022/0254097 A1    Aug. 11, 2022

(51) Int. Cl.
*G06F 3/04845* (2022.01)
*G06T 11/60* (2006.01)
*G06T 15/20* (2011.01)

(52) U.S. Cl.
CPC ........ *G06T 15/205* (2013.01); *G06F 3/04845* (2013.01); *G06T 11/60* (2013.01); *G06T 2200/24* (2013.01)

(58) Field of Classification Search
CPC ... G06F 3/04845; G06T 11/60; G06T 15/205; G06T 2200/24
See application file for complete search history.

(56) References Cited

U.S. PATENT DOCUMENTS

| | | | | |
|---|---|---|---|---|
| 5,490,241 A * | 2/1996 | Mallgren | ............ | G06F 3/04845 345/441 |
| 5,499,330 A * | 3/1996 | Lucas | ................... | G06F 3/0483 715/848 |
| 5,798,761 A * | 8/1998 | Isaacs | ................. | G06F 3/04815 345/419 |
| 6,266,068 B1 * | 7/2001 | Kang | ...................... | G06T 11/60 345/422 |
| 6,426,745 B1 * | 7/2002 | Isaacs | ................. | G06F 3/04845 345/619 |
| 2006/0087519 A1 * | 4/2006 | Berger | .................... | G06T 11/60 345/619 |
| 2006/0107229 A1 * | 5/2006 | Matthews | ............. | G06F 3/0481 715/782 |
| 2007/0113198 A1 * | 5/2007 | Robertson | ............. | G06F 3/0481 715/848 |
| 2007/0126732 A1 * | 6/2007 | Robertson | ............. | G06F 3/0481 345/419 |
| 2010/0107101 A1 * | 4/2010 | Shaw | .................... | G06F 3/0481 715/766 |

(Continued)

*Primary Examiner* — Tamara T Kyle
*Assistant Examiner* — William Wong
(74) *Attorney, Agent, or Firm* — FIG.1 Patents

(57) ABSTRACT

Digital image editing techniques are described as implemented by a depth-aware system of a computing device. The depth-aware system employs a depth-aware grid that defines constraints for depth-aware editing of digital images involving perspective. These techniques support automated editing in which changes to directional spacing, perspective arrangement, perspective movement, object redistribution, and so on are implemented in real time, which is not possible in conventional techniques involving object distortion. As such, these techniques improve operation of the computing device that implements these techniques as well as user efficiency in interacting with the computing device to perform digital image editing that involves perspective.

20 Claims, 24 Drawing Sheets

(56) References Cited

U.S. PATENT DOCUMENTS

| | | | |
|---|---|---|---|
| 2011/0074784 A1* | 3/2011 | Turner | H04N 13/261 |
| | | | 345/427 |
| 2012/0131495 A1* | 5/2012 | Goossens | G06F 3/04815 |
| | | | 715/781 |
| 2012/0159364 A1* | 6/2012 | Hyun | G06F 3/04815 |
| | | | 715/848 |
| 2013/0187866 A1* | 7/2013 | Kim | G06F 3/0488 |
| | | | 345/173 |
| 2015/0356343 A1* | 12/2015 | Jain | G06T 11/203 |
| | | | 345/419 |
| 2016/0071328 A1* | 3/2016 | Yao | G06F 3/04895 |
| | | | 345/630 |
| 2017/0221236 A1* | 8/2017 | Dowd | G06F 3/04847 |
| 2019/0012843 A1* | 1/2019 | Zhou | G06T 19/20 |
| 2019/0114051 A1* | 4/2019 | McBeth | G06F 3/0482 |
| 2020/0004225 A1* | 1/2020 | Buller | B29C 64/393 |
| 2020/0089397 A1* | 3/2020 | Chung | G06F 16/176 |

\* cited by examiner

Directional Spacing

1: procedure DIRECTIONAL SPACING
2:   Theta = Rotation on the grid to define its directional axis
3:   L = List of Objects on which Theta-Angled-Depth-Aware Grid is invoked.
4:   Alpha = Angular direction of axis A
5:   Beta = Angular Direction of Axis B
6:   When Spacing Attribute for Axis A is changed by P Percentage varying from [-100 : 100]
7:   for each object O in Environment do
8:     Line L = Line passing through O centre C and angle = (Alpha + 90)
9:     C' = Find new centre position at line L at X distance apart from its original Position C
10:    Translational Transformation T = C-C'
11:    Apply this T to Object O
12:    Update the position of object O
13:  When Spacing Attribute for Axis B is changed by P Percentage varying from [-100 : 100]
14:  Do the same for Axis B as well as done for Axis A

FIG. 9

Perspective Distribution

```
1: procedure PERSPECTIVEDISTRIBUTION
2:   for each object O in Environment do
3:     C' = Calculate the perspective position of the center C of object O in perspective X
4:     Translational Transformation = C-C'
5:     Apply the T on Object O
6:     Update the position of object O
```

Perspective Scaling

```
1: procedure PERSPECTIVESCALING
2:   for each object O in Environment do
3:     C = Centre of Object O
4:     Push centre to vector V as [O, C]
5:   Sort the vector V based on horizontal element of Center C of objects for Axis A(sort based on for vertical element for Axis B)
6:   L = Get the leftmost center
7:   V = vanishing point of perspective
8:   S = create a line segment joining these 2 points at vertical position = (Vanishing point Vertical position). The line is parallel to x-Axis
9:   Let this be the scaling meter for the objects
10:  for each object O in Environment do
11:    H' = Calculate the horizontal difference of the object center C and V
12:    H = Horizontal difference of L and V
13:    Scale Value = (H'/H)
14:    Scale down the object size to (H'/H) percentage
```

Perspective Stack Ordering 1. procedure PERSPECTIVESTACKORDERING
2.   for each object O in Environment do
3.     C = Centre of Object O
4.     Push centre to vector V as [O, C]
5.   DepthAwareSort:
6.   Sort the element from top right to bottom left fashion for perspective effect
7.   Sort the vector V based on horizontal element of Center C of objects for Axis A in decreasing order(sort based on for vertical element for Axis B)
8.   In case of same horizontal element, sort based on vertical element in increasing order
9.   From the sorted vector of objects, based on their center position, reorder the object hierarchy by keeping the front object in the bottom and all incoming objects above it in stack order.
10.  Inverse rotate the Grid and the new arrangement of the objects

FIG. 17

| Perspective Movement |
|---|
| 1: procedure PERSPECTIVEMOVEMENT |
| 2:  S = Object in movement |
| 3:  E = Objects in Environment. |
| 4:  Theta = Rotation on the grid to define its directional axis |
| 5:  Reverse rotate the entire grid and attached objects by the Theta |
| 6:  V = Get the sorted vector of objects based on centre Order from last |
| 7:  Cp= For each new input position of S, get the centre position of S |
| 8:  DEPTHAWARESORT |
| 9:  Inverse rotate the Grid and the new arrangement of the objects |

FIG. 20

| Depth Aware Sort |
|---|
| 1: procedure DEPTHAWARESORT |
| 2:   Sup = Do a binary search for the Cp in vector V to get the upperBound() object with C just same of more depth in perspective. |
| 3:   Reorder the object S just below the Sup in the layer hierarchy to give the correct sense of depth of object S |

Pre-Processing

1: procedure PREPROCESSING
2:   G = Get the grid path that is being manipulated to give objects a new directional flow
3:   for each object O in Environment E of Depth Aware Grid do
4:     C = Centre of O
5:     B = From each of the segments of the Bezier Spline of G, detect the nearest Bezier of G relative to C
6:     P = Get the nearest point on B for C
7:     T = Get the T value of Bezier B for projection of C on B
8:     Store this info {B,P,T} within the O dictionary

FIG. 23

| Grid Editing |
|---|
| procedure GRIDEDITING |
| 1: G = Get the grid path that is being manipulated to give objects a new directional flow |
| 2: On editing the grid Bezier, its geometry will get updated. |
| 3: for each object O in Environment E of Depth Aware Grid do |
| 4: Prev = Get the initial stored info within O of (B,P,T) |
| 5: Pnew = For the Bezier B, after edit transformation, calculate the new position of point at same T value |
| 6: Tx = P - Pnew |
| 7: Apply this transformation onto the new Object O |
| 8: Update the metadata info within the object O with data (B,Pnew,T) |
| 9: This way, we maintain the same relationship of objects with the grid before and after the transformation. |

FIG. 24

DIGITAL IMAGE EDITING USING A DEPTH-AWARE SYSTEM

BACKGROUND

A variety of techniques are employed by illustrators of digital images to make content depicted by the images visually relatable. An example of this involves perspective. Perspective is a technique used to represent a relationship of objects to each other in a digital image in order to give the illusion of depth and distance in the digital image. In this way, the objects in the digital image mimic real world scenarios in a manner that follows visual expectations of the viewers.

Conventional techniques typically used to implement perspective by computing devices, however, mainly rely on manual expertise of the illustrator. Thus, the illustrator is tasked with manually arranging objects within the digital image, such as to support one point, two point, or three-point perspectives in the digital image. These manual techniques are challenged when tasked with large numbers of objects within the digital image and could fail in such instances because of reliance on the illustrator to correctly illustrating perspective for each object in the digital image. These challenges increase in scenarios involving multiple related digital images, such as to create a storyboard that involves changes in viewing angle, rearrangements of artwork, and movement of objects in successive digital images.

SUMMARY

Digital image editing techniques are described as implemented by a depth-aware system of a computing device. The depth-aware system employs a depth-aware grid that defines constraints for depth-aware editing of digital images involving perspective. These techniques support automated editing in which changes to directional spacing, perspective arrangement, perspective movement, object redistribution, and so on are implemented in real time, which is not possible in conventional techniques involving object distortion. As such, these techniques improve operation of the computing device that implements these techniques as well as user efficiency in interacting with the computing device to perform digital image editing that involves perspective.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

Figure 2:
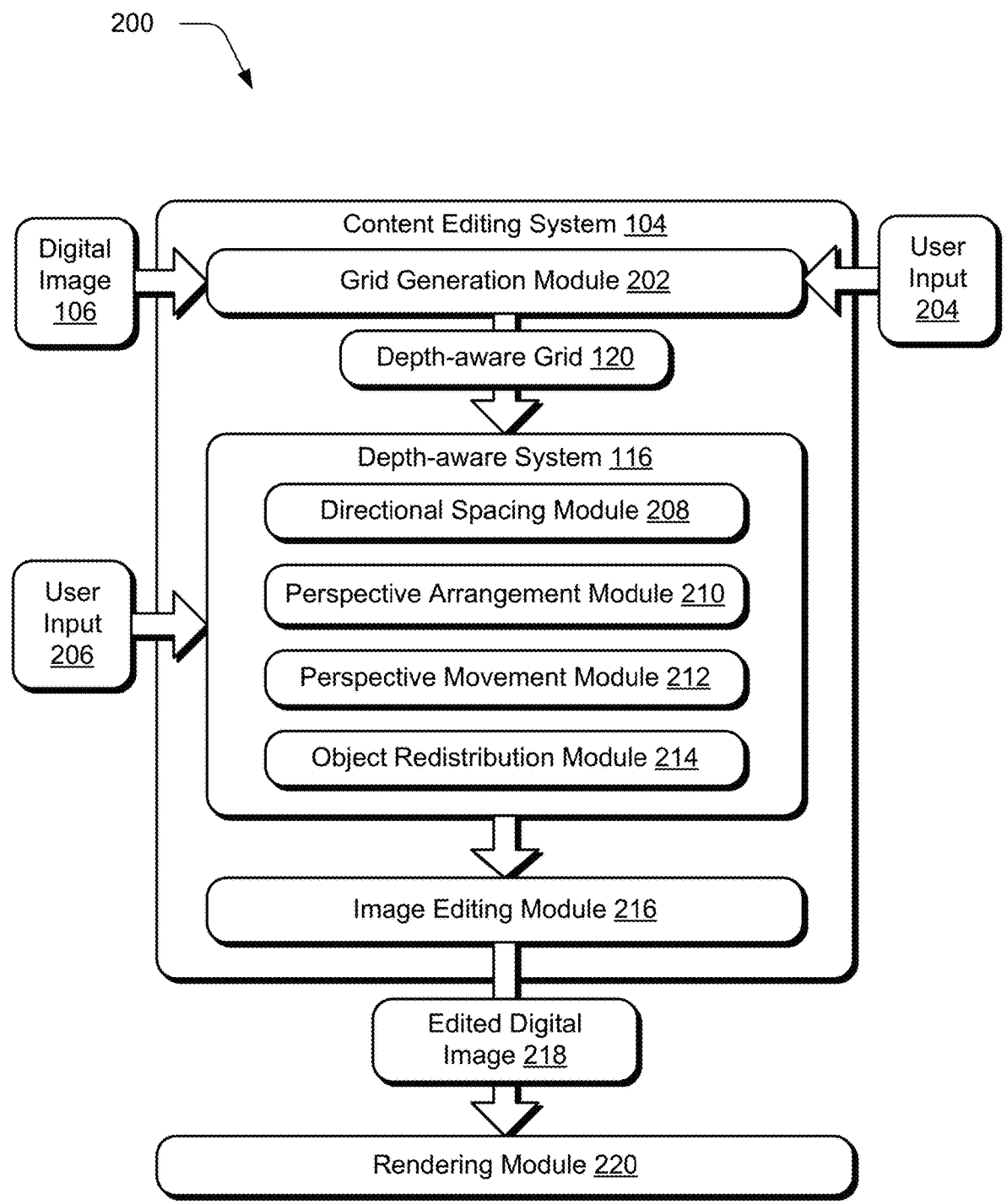
FIG. 2 depicts a system in an example implementation showing operation of a depth-aware system of FIG. 1 in greater detail as supporting digital image editing through use of a depth-aware grid.

FIG. is a flow diagram depicting a procedure in an example implementation of digital image editing using a depth-aware system of FIG. 2.

Figure 5:
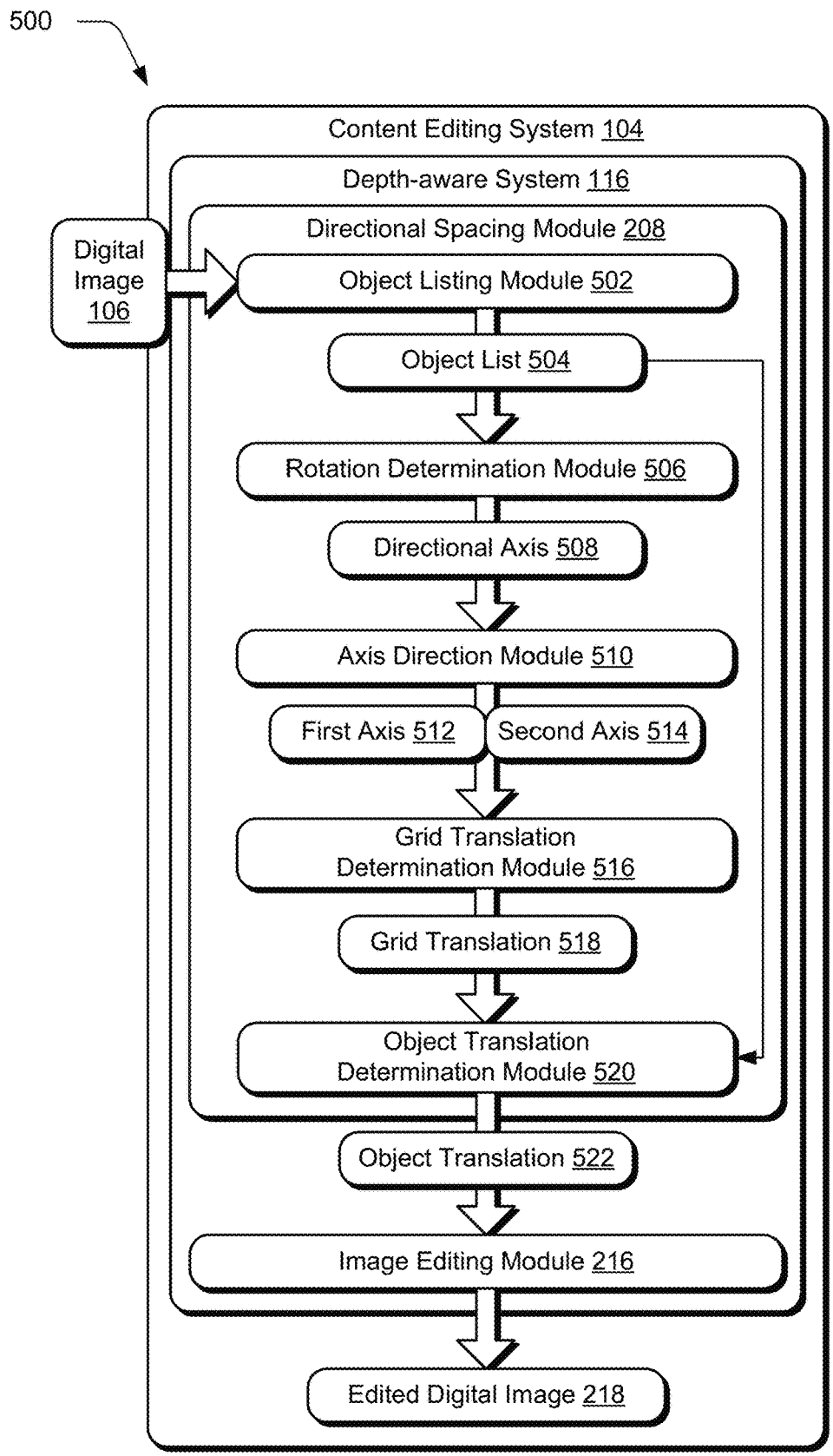

FIG. 5 depicts a system in an example implementation showing operation of a directional spacing module of the depth-aware system of FIG. 2 in greater detail.

Figure 6:
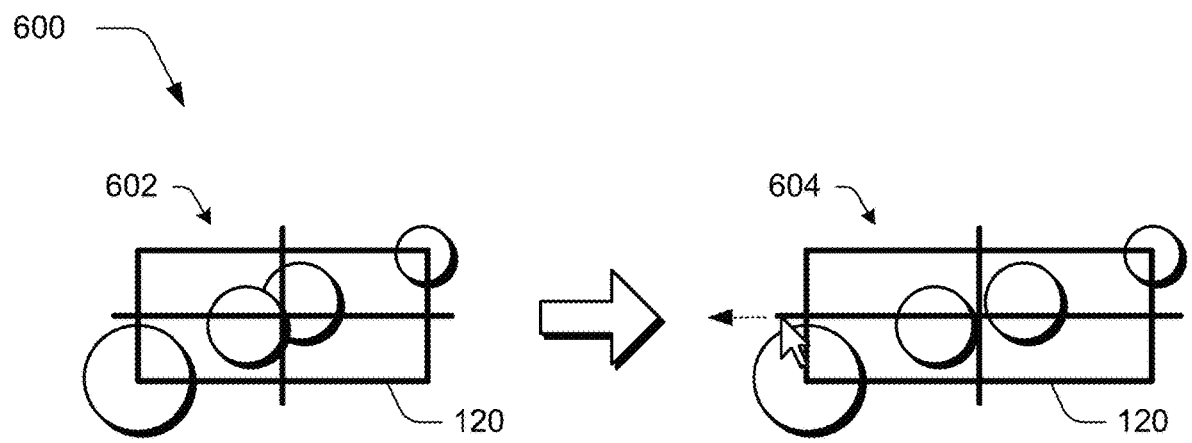
Figure 7:
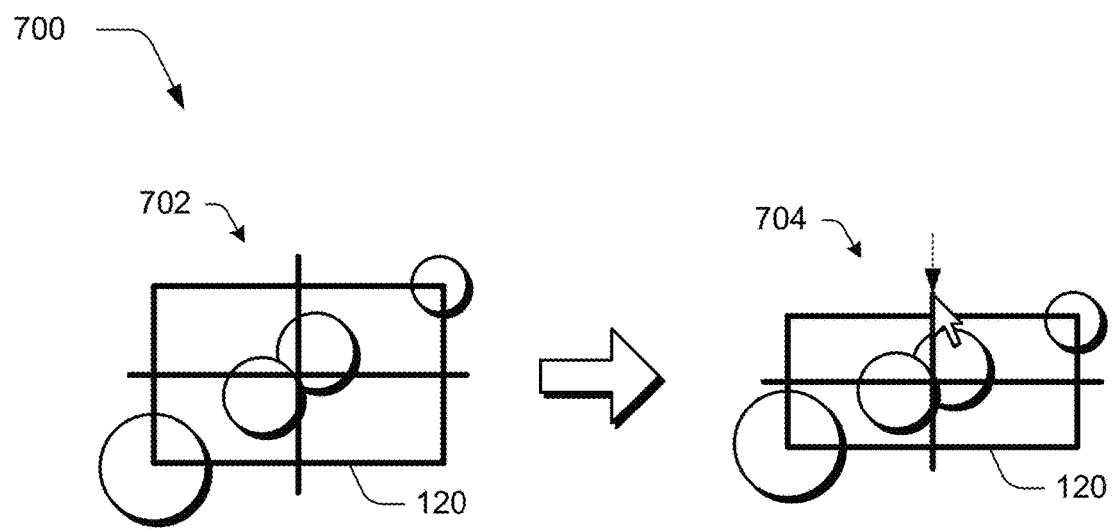

FIGS. 6 and 7 show examples of directional spacing between objects through direct interaction with the depth-aware grid.

Figure 8:
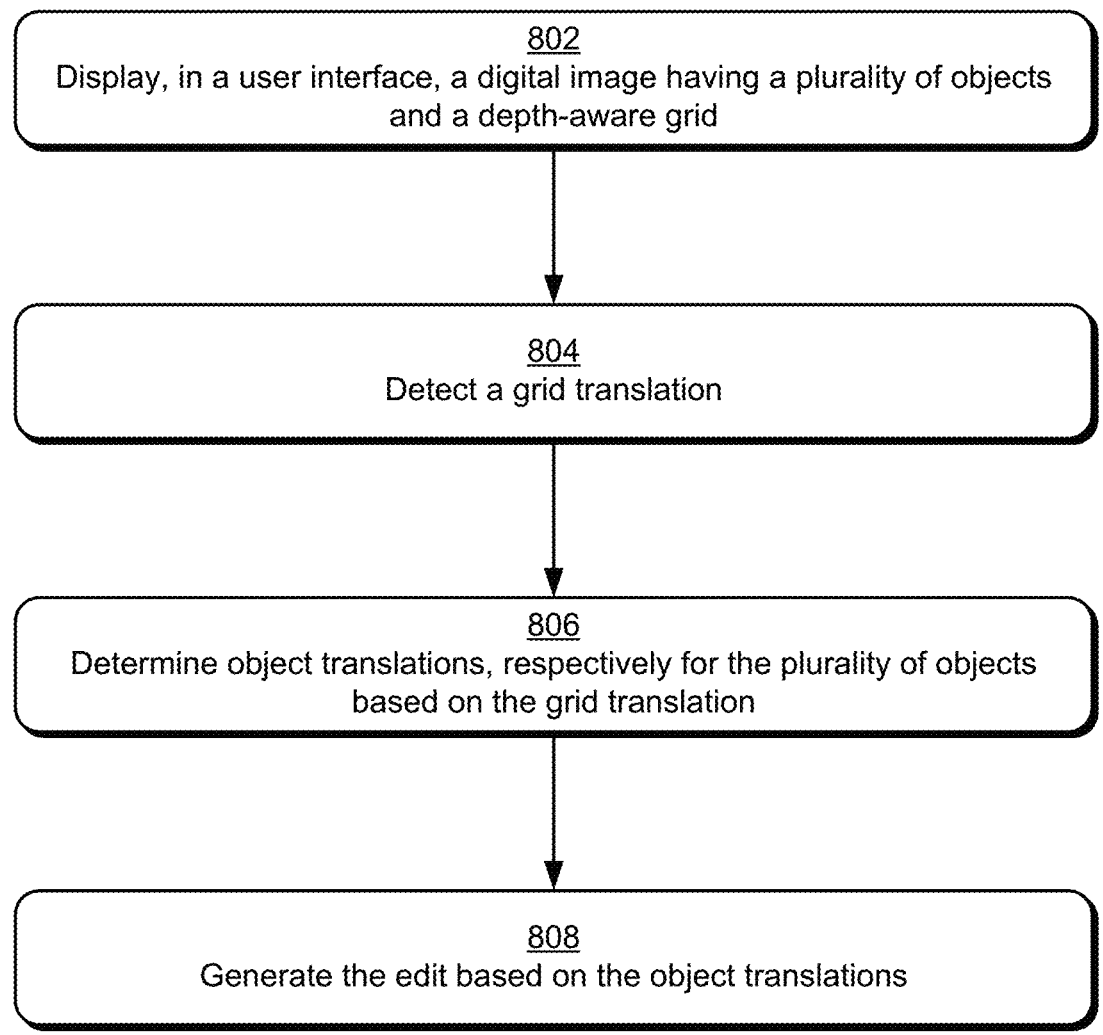

FIG. 8 is a flow diagram depicting a procedure in an example implementation of direction spacing based on generation of object translations for objects 108 based on a detected grid translation of the depth-aware grid.

FIG. 9 depicts an example of a directional spacing algorithm.

Figure 10:
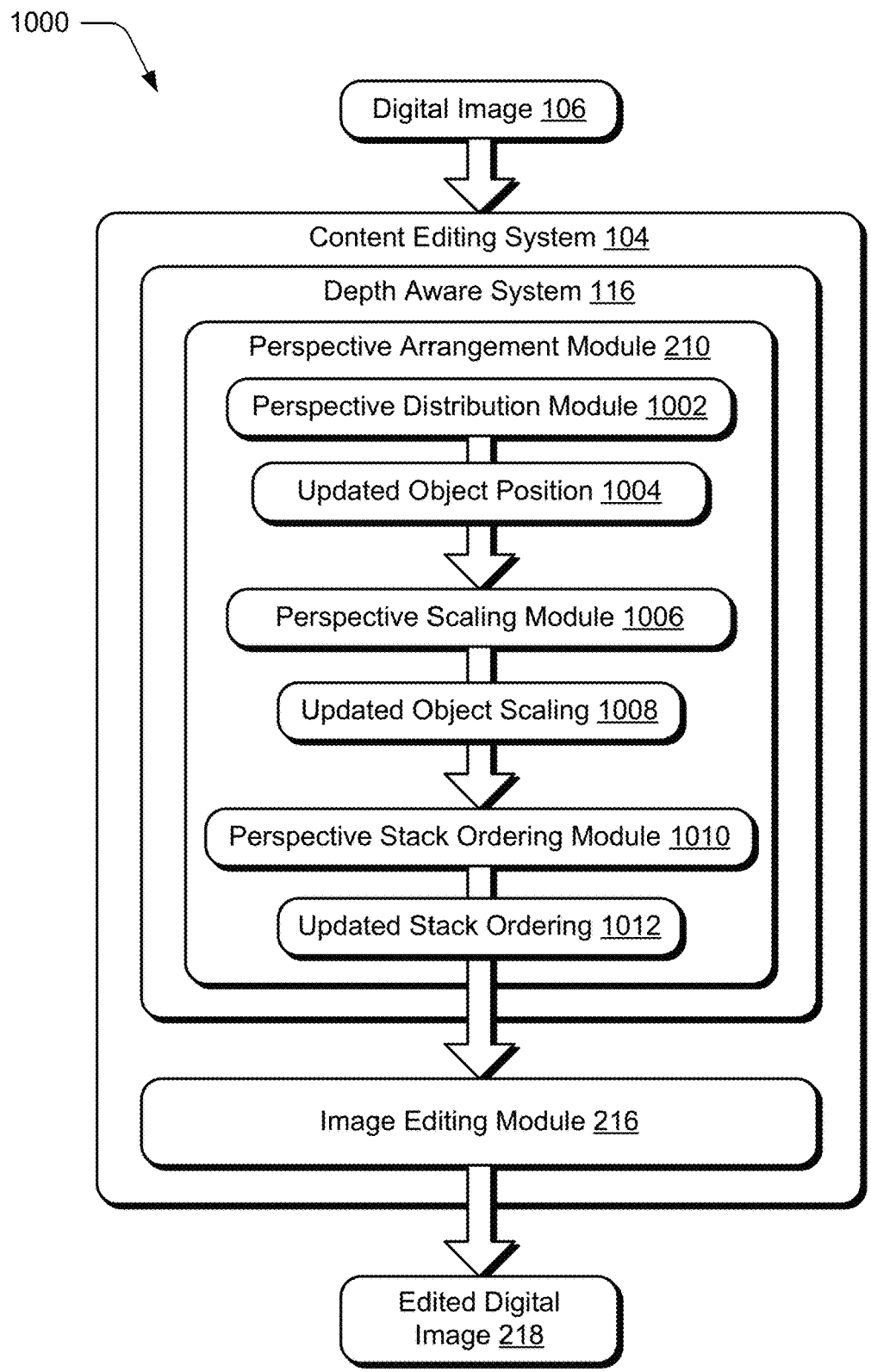

FIG. 10 depicts a system in an example implementation showing operation of the perspective arrangement module of the depth-aware system in greater detail.

Figure 11:
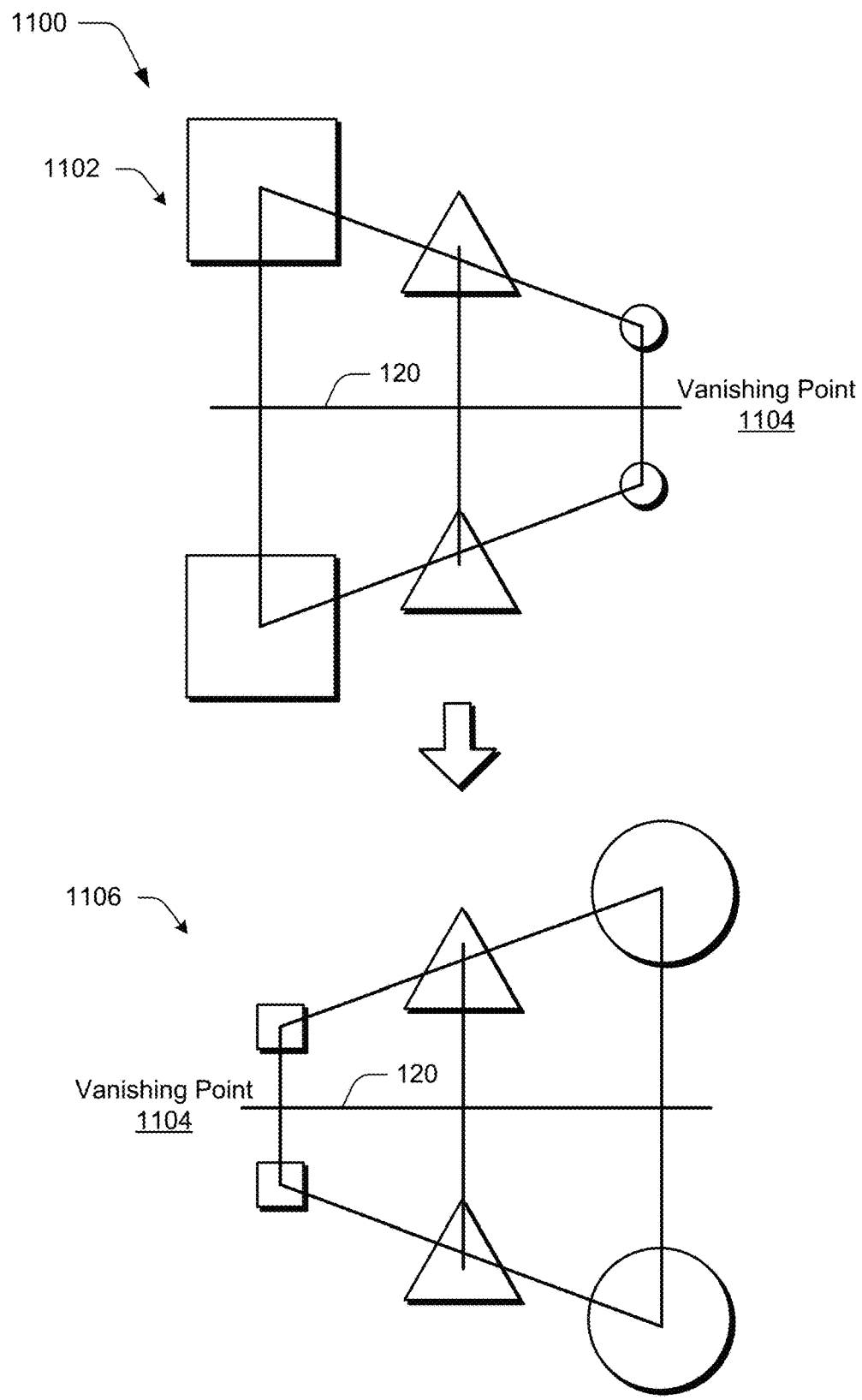
Figure 12:
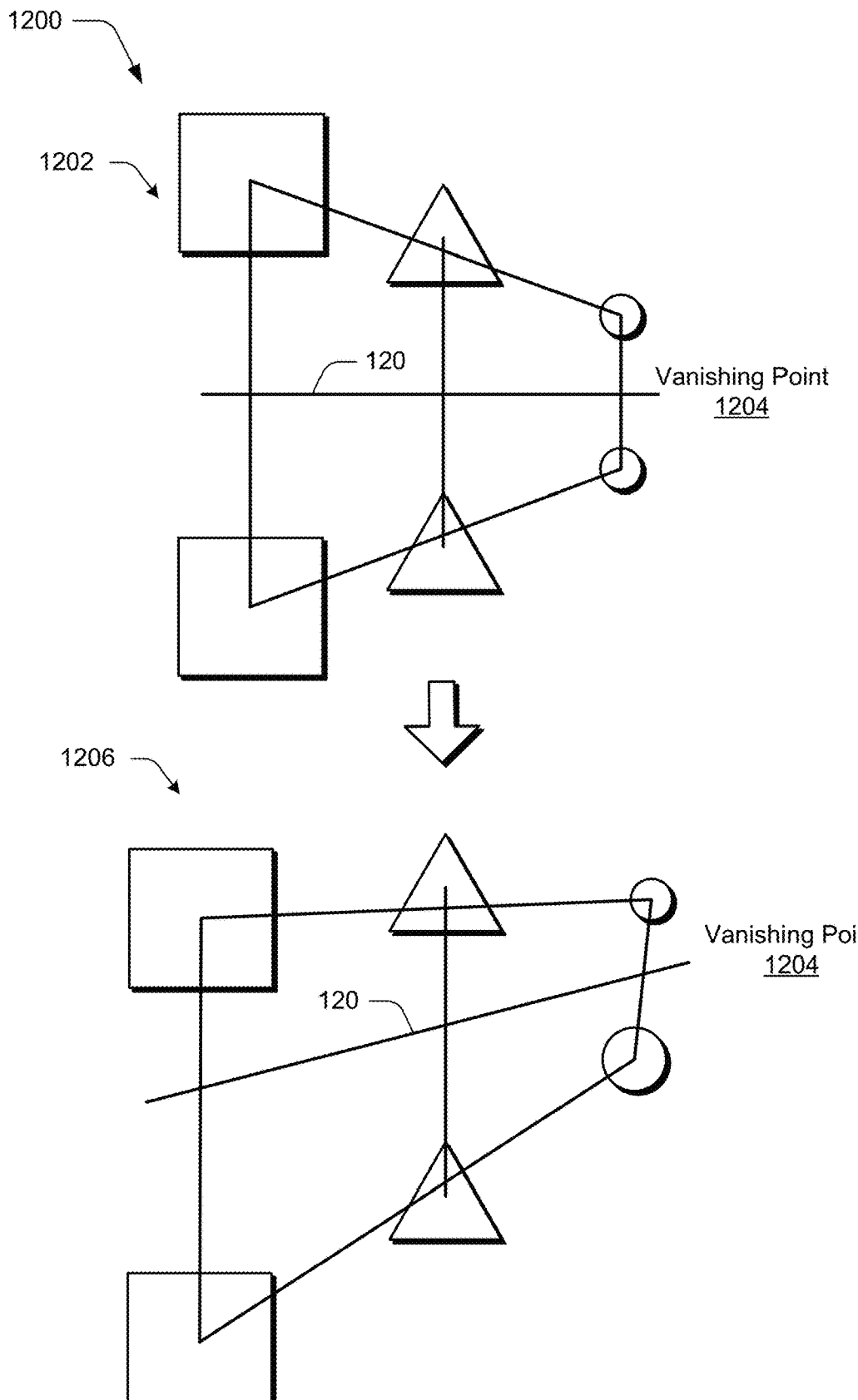

FIGS. 11 and 12 depict examples of perspective arrangement of objects through direct interaction with a depth-aware grid.

Figure 13:
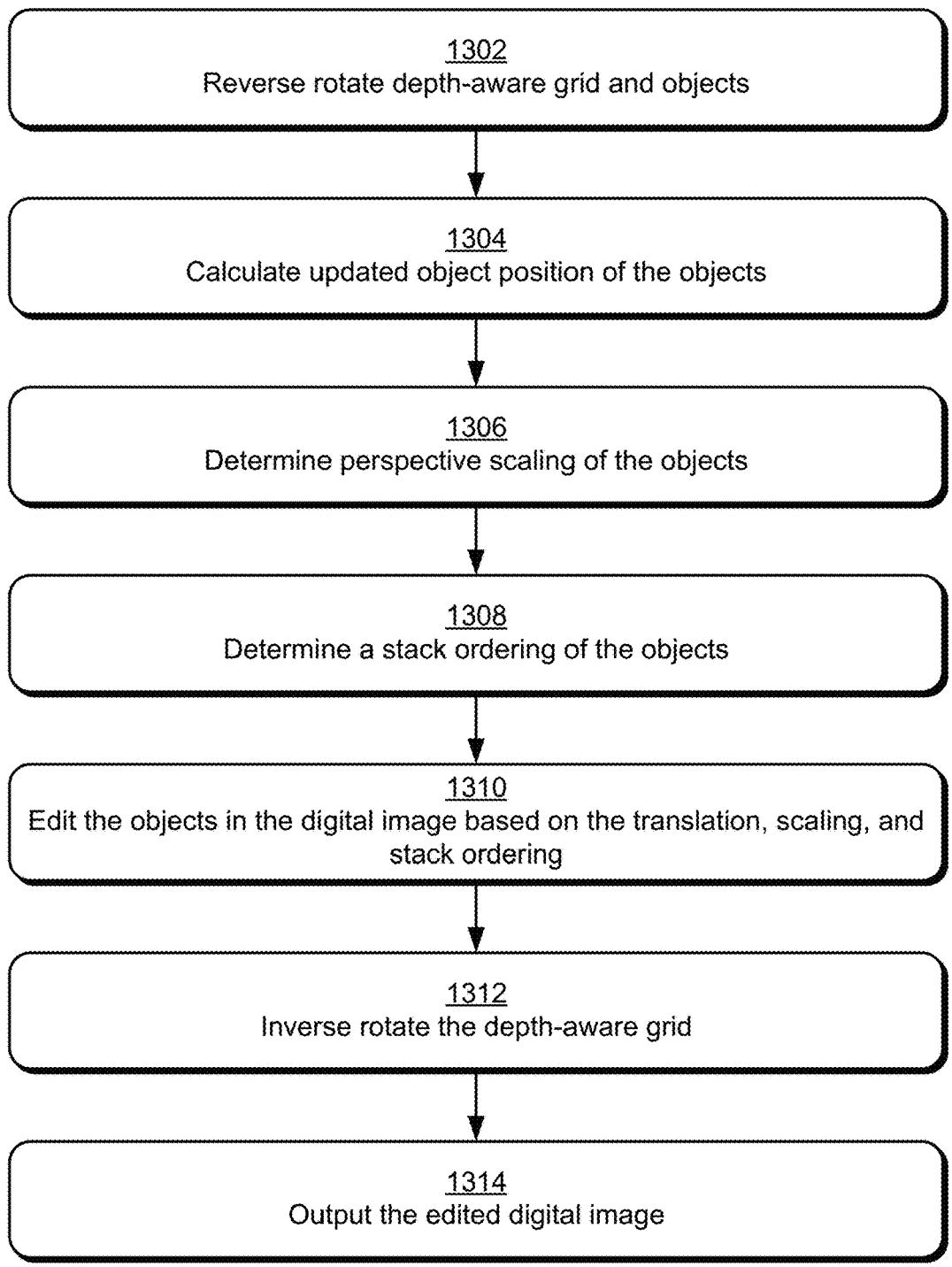

FIG. 13 is a flow diagram depicting a procedure in an example implementation of perspective arrangement including perspective distribution, perspective scaling, and perspective stack ordering.

Figure 14:
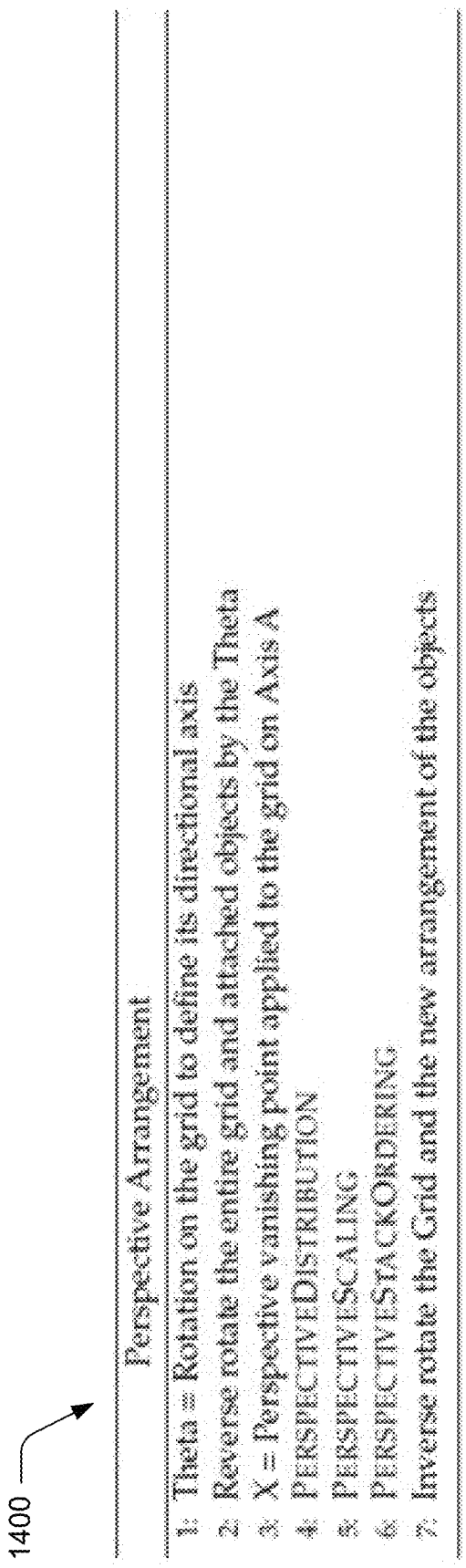

FIG. 14 depicts an example of a perspective arrangement algorithm.

FIG. 15 depicts an example of a perspective distribution algorithm of the perspective arrangement algorithm of FIG. 14.

FIG. 16 depicts an example of a perspective scaling algorithm of the perspective arrangement algorithm of FIG. 14.

FIG. 17 depicts an example of a perspective stack ordering algorithm of the perspective arrangement algorithm of FIG. 14.

Figure 18:
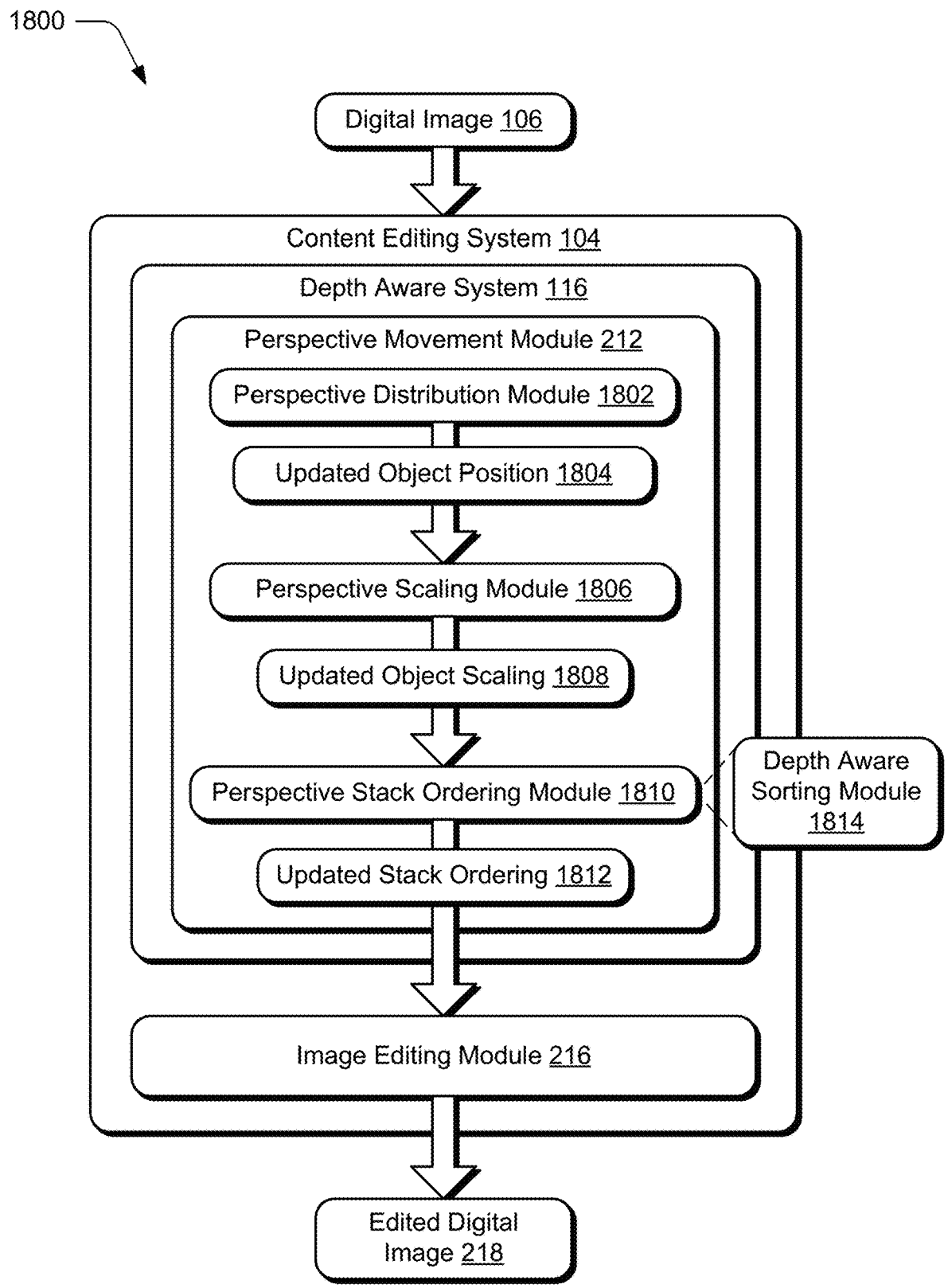

FIG. 18 depicts a system in an example implementation showing operation of a perspective movement module of the depth-aware system of FIG. 2 in greater detail.

Figure 19:
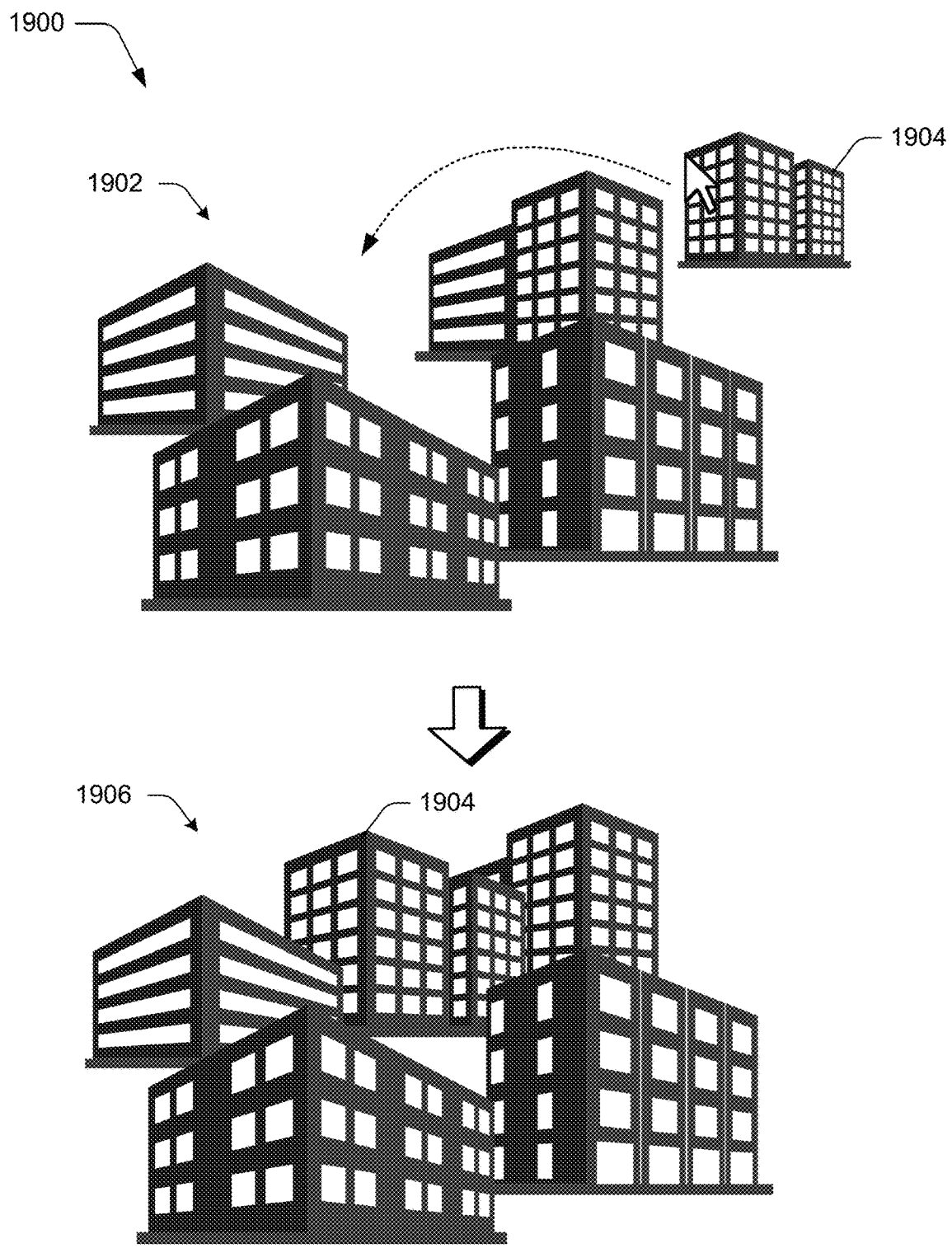

FIG. 19 depicts an example of perspective movement of an objects through direct interaction with the object.

FIG. 20 depicts an example of a perspective movement algorithm.

Figure 21:
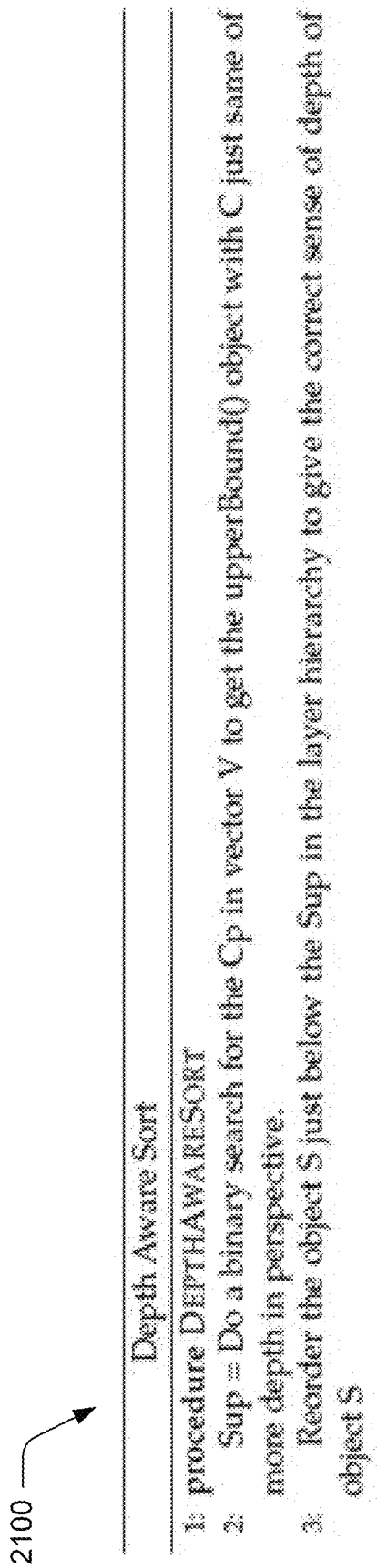

FIG. 21 depicts an example of a depth aware sort algorithm of the perspective movement algorithm of FIG. 20.

Figure 22:
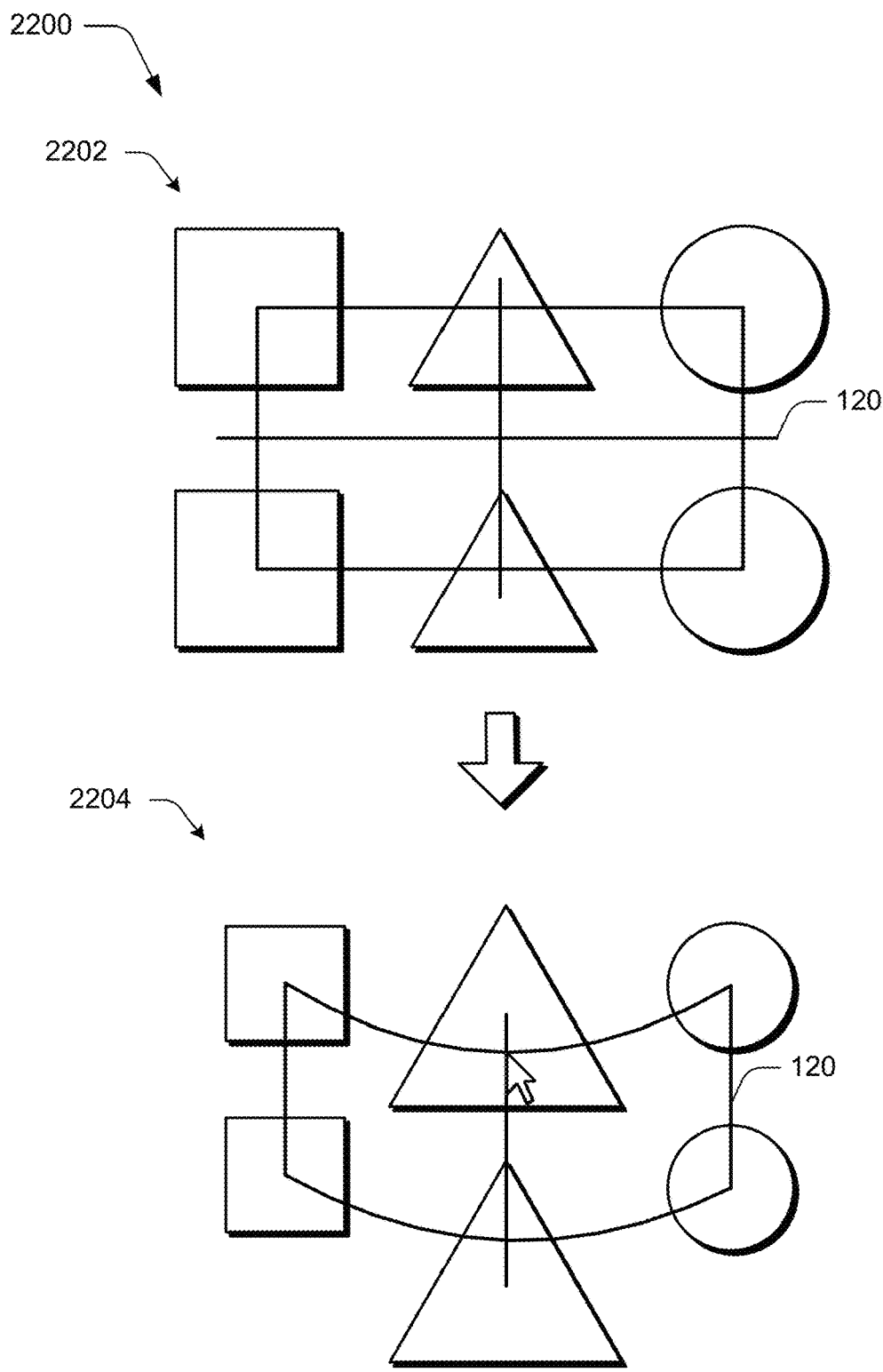

FIG. 22 depicts an example of object redistribution responsive to an edit made to a shape of a depth-aware grid.

FIG. 23 depicts an example of a preprocessing algorithm for object redistribution.

FIG. 24 depicts an example grid editing algorithm.

Figure 25:
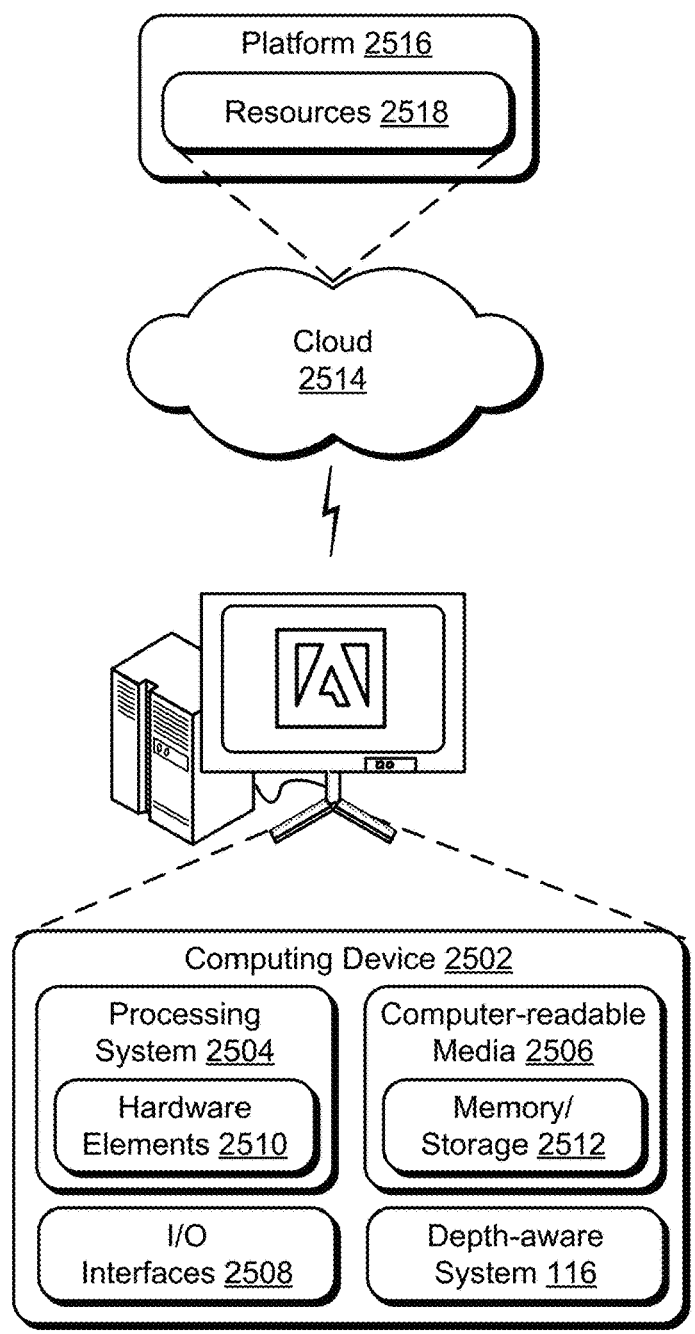

FIG. 25 illustrates an example system including various components of an example device that can be implemented as any type of computing device as described and/or utilize with reference to FIGS. 1-24 to implement embodiments of the techniques described herein.

DETAILED DESCRIPTION

Overview

Perspective is a technique in which objects are arranged within a digital image (i.e., a two-dimensional digital image) to give an appearance of depth in relation to a viewpoint, which is referred to as a perspective viewpoint in the following description. Conventional techniques used by computing devices to support perspective typically rely on manual expertise of the illustrator as having a prior understanding of the scientific approach of perspective. Although conventional techniques have been developed for assisting with perspective, these techniques distort objects within the digital image, do not address the rules of perspective, and are not capable of being implemented in real time by a computing device. Thus, these conventional techniques are computationally inefficient, are not suited for a variety of content creation tasks such as storyboards and digital videos, and result in user frustration.

Accordingly, digital image editing techniques are described as implemented by a depth-aware system of a computing device. The depth-aware system employs a depth-aware grid that defines constraints for depth-aware editing of digital images involving perspective. These techniques support automated editing in which changes to directional spacing, perspective arrangement, perspective movement, object redistribution, and so on are implemented in real time, which is not possible in conventional techniques involving object distortion. As such, these techniques improve operation of the computing device that implements these techniques as well as user efficiency in interacting with the computing device to perform digital image editing that involves perspective.

In one example, a digital image having a plurality of objects is output in a user interface by a computing device. An input is received by the computing device via the user interface involving selection of an option by a user to initiate output of a depth-aware grid. The depth-aware grid is configurable in a variety of ways to define perspective in relation to objects included in the digital image.

A default configuration in this example defines one or more planes that are orthogonal to a viewing direction of the user with respect to the user interface, e.g., depicted as a rectangle. Thus, lines along first and second axis of the depth-aware grid appear parallel to each other and do not converge in the user interface in this default arrangement. As such, the perspective of the digital image with respect to the objects within the digital image coincides with that of a viewpoint of a user that views the digital image. Other default arrangements are also contemplated, including automated perspective detection of objects included in the digital image (e.g., through detection of a vanishing point) which is then output in the user interface.

This default configuration is modifiable by the user to define other perspective viewpoints, both initially and/or for subsequent modification. For example, by moving an axis within a default depth-aware grid, a perspective viewpoint is defined that differs from that of the user, i.e., the user's viewpoint does not coincide with the perspective exhibited by objects in the digital image from the perspective viewpoint. The perspective viewpoint is defined in relation to vanishing point. The vanishing point defines a point on a plane of the depth-aware grid where two-dimensional perspective projections of mutually parallel lines in three-dimensional space appear to converge. Thus, depth as defined by the vanishing point in the digital image progresses from the vanishing point outward. The depth also defines a stack order (i.e., overlap) of objects within the digital image as further described below.

The depth-aware grid is leveraged by the computing device to support automated editing of objects within the digital image. This includes editing based on user interaction that involves direct interaction with depth-aware grid itself and also user interaction directly with the objects, themselves. In a first such example, spacing between objects may be changed in any direction through rotation of the grid and a "click-and-drag" to any axis of the grid is used to increase or decrease spacing between objects by resizing the grid, itself. Thus, rotation and/or resizing the depth-aware grid in this example results in a corresponding rotation and/or resizing of spacing between objects along a corresponding plane defined by the depth-aware grid.

In another example involving interaction with the depth-aware grid, perspective arrangement includes automated arrangement of objects within the digital image based on a change in a perspective viewpoint defined by a corresponding change in the depth-aware grid. User inputs, for instance, are received that change a perspective viewpoint defined using the depth-aware grid, i.e., such that a location of a vanishing point of the grid is changed from a first location to another. Based on this change, the computing device changes a distribution, scale, and/or stack order of objects within the digital image, automatically and without user intervention This is performed, without distorting the objects as required in conventional techniques, in a manner such that adjustments to the objects (e.g., spacing, scaling, and/or stack order) are visually consistent with the change in perspective viewpoint. As a result, the depth-aware system supports efficient changes in perspective, such as to increase efficiency in generating a sequence of frames of a digital video, generate a storyboard through corresponding digital images, and so forth.

In yet another example, the depth-aware grid is also configurable for modification beyond defining a single flat plane. A user input, for instance, is received by the depth-aware system to configure an axis of the depth-aware grid from a plane to include one or more curves, angles, and so on. In response, the depth-aware system configures distribution, scale, and stack order of the objects within the digital image based on the grid to follow the change, e.g., to have a depth that increase and then decreases along a curve. In this way, the depth-aware system supports functionality that is simply not possible in conventional techniques.

In a further example that involves direct user interaction with the objects, the depth-aware system supports perspective movement of objects within the digital image. Consider an example in which objects in a digital image are depicted as buildings arranged along a hillside. The depth-aware system is configured to support user interaction to automatically change scaling and stack order (i.e., z order) of the objects based on movement of the objects in relation to a defined depth-aware grid, whether the grid is rendered or not in the user interface. The scaling and stack order, for instance, are calculated and displayed in real time as the object is moved in this example (e.g., selecting a building to move "forward" or "backward") based on a relative position of the object to the depth-aware grid without distorting the object. As a result, the digital image is suitable for further processing, such as to generate subsequent frames in a storyboard or digital video. This is not possible in conventional techniques that distort the objects. Further discussion of these and other examples is included in the following sections and shown in corresponding figures.

Term Examples

"Perspective" involves an appearance of objects relative to one anther as determined by a relative distance from a vanishing point. Scale and stack order (i.e., depth order or "z-order") are applied to corresponding objects to an appearance of depth to the objects through overlap, sizing, and so forth. A "perspective viewpoint" is defined as following this perspective based on a vanishing point. A "user viewpoint" refers to a point from which a user views the digital image, which may or may not correspond to the perspective viewpoint.

"Vanishing point" defines a point on a plane of the depth-aware grid where two-dimensional perspective projections of mutually parallel lines in three-dimensional space appear to converge and because of this also defines relative depths within the image. Thus, depth as defined by the vanishing point in the digital image progresses along a path from the vanishing point outward and thus also defines the "perspective viewpoint."

A "digital image" is any image capable of being rendered for display by a computing device, e.g., by a display device, printer, and so forth. Examples of digital images include a variety of formats, include jpeg, png, and so on. "Objects" are included within the digital images, examples of which include raster objects, bitmaps, vector objects, and so forth.

In the following discussion, an example environment is described that is configured to employ the techniques described herein. Example procedures are then described which are performable in the example environment as well as other environments. Consequently, performance of the example procedures is not limited to the example environment and the example environment is not limited to performance of the example procedures.

Example Environment

Figure 1:
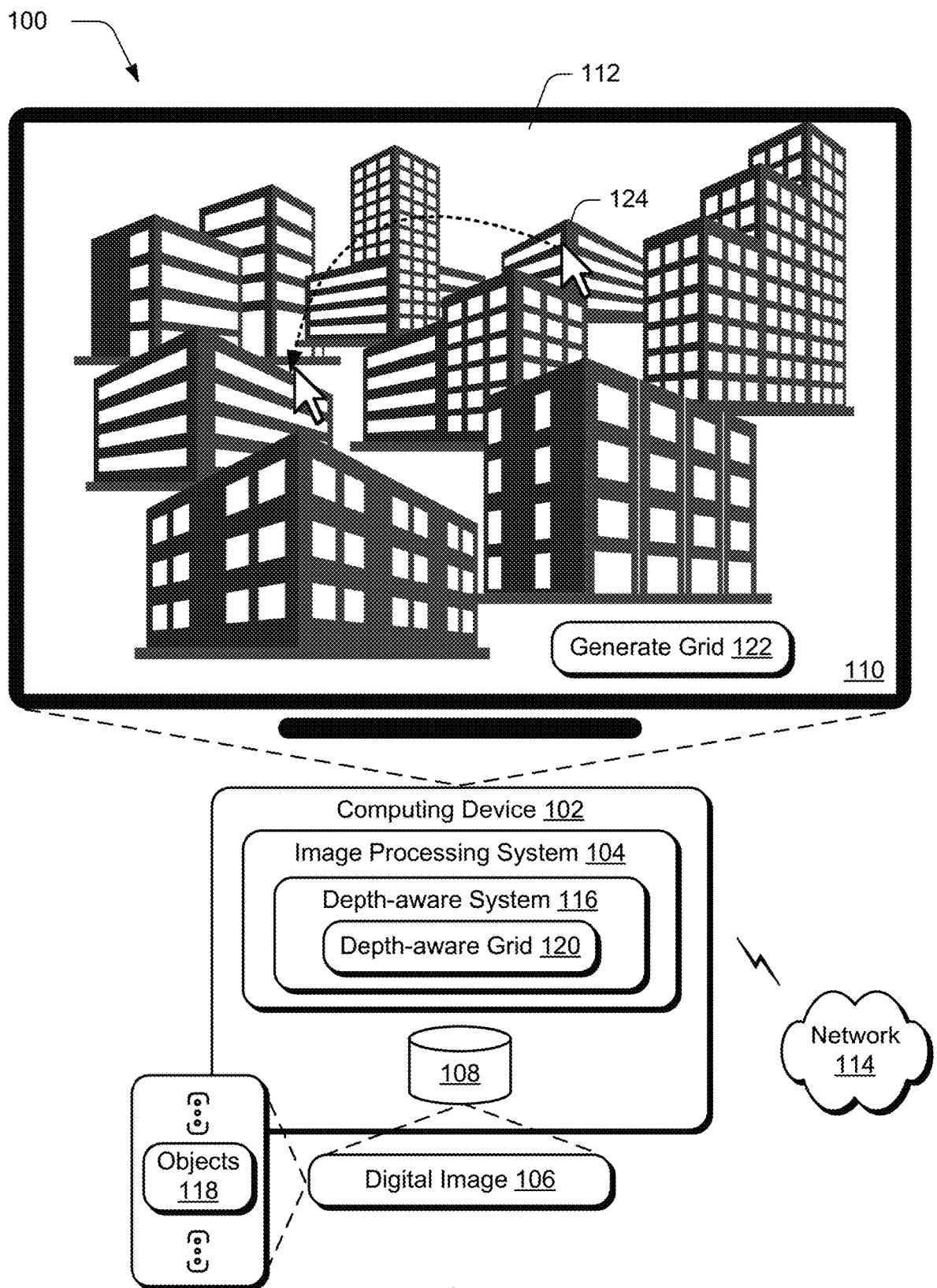
FIG. 1 is an illustration of a digital medium environment in an example implementation that is operable to employ digital image editing techniques described herein.

FIG. 1 is an illustration of a digital medium environment 100 in an example implementation that is operable to employ depth aware digital image editing techniques described herein. The illustrated digital medium environment 100 includes an example of a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 25.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as a depth-aware system 116. The depth-aware system 116 implements techniques to manage perspective and depth of objects 118 within a digital image 106 as part of digital image 106 creation and editing through use of a depth-aware grid 120. The depth-aware grid 120, for instance, defines spacing between the objects 118, scaling of the objects 118, and a stack ordering (i.e., depth order or "z" order) of the objects 118 in the digital image 106 to remain consistent with a perspective viewpoint defined by the depth-aware grid 120, and may do so in real time. In this way the depth-aware system 116 improves operation of the computing device 102 and increases user efficiency in editing the digital image 106.

In the illustrated example of the user interface 110 rendered by the display device 112, objects 118 are depicted as a plurality of buildings arranged along a hill. An option 122 is included to initiate generation of the depth-aware grid 120 to manage spacing, scale, and stack order of the objects 118 within the digital image 106 to maintain or change perspective. In one example, this includes user interaction with the depth-aware grid 120 (e.g., to change spacing, rotation, or perspective viewpoint) of the objects 118 together. In another example, this involves user interaction with the objects 118 themselves, e.g., to move a building 124 "forward" along the perspective defined by the depth-aware grid 120 and have the depth-aware system 116 adjust scale and stack order of the building 124 based on this change, automatically and without user intervention. Further discussion of these and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Depth Aware Digital Image Editing

Figure 3:
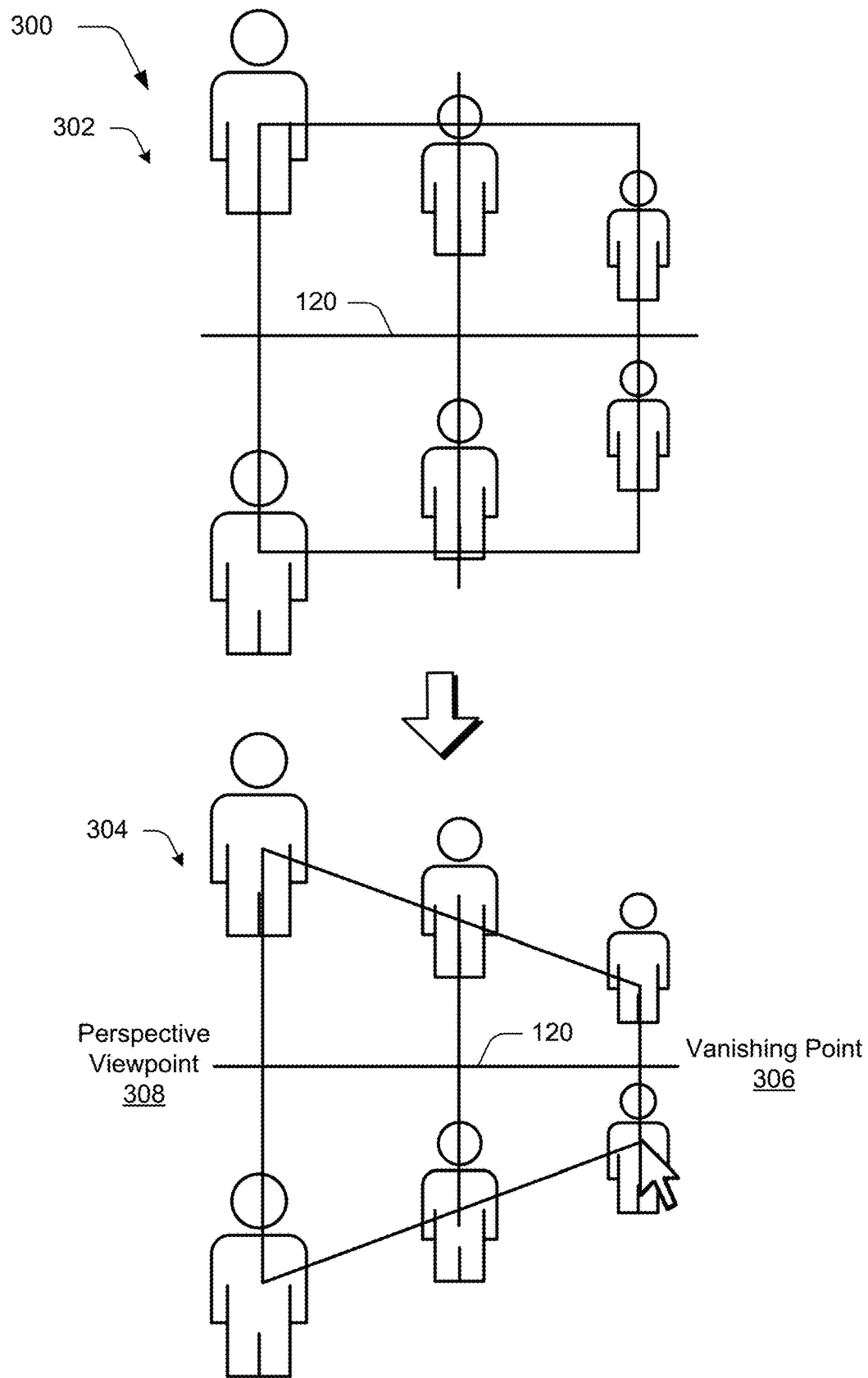
FIG. 3 depicts an example of output of a default depth-aware grid and modification of the grid responsive to a user input by the depth-aware system.
Figure 4:
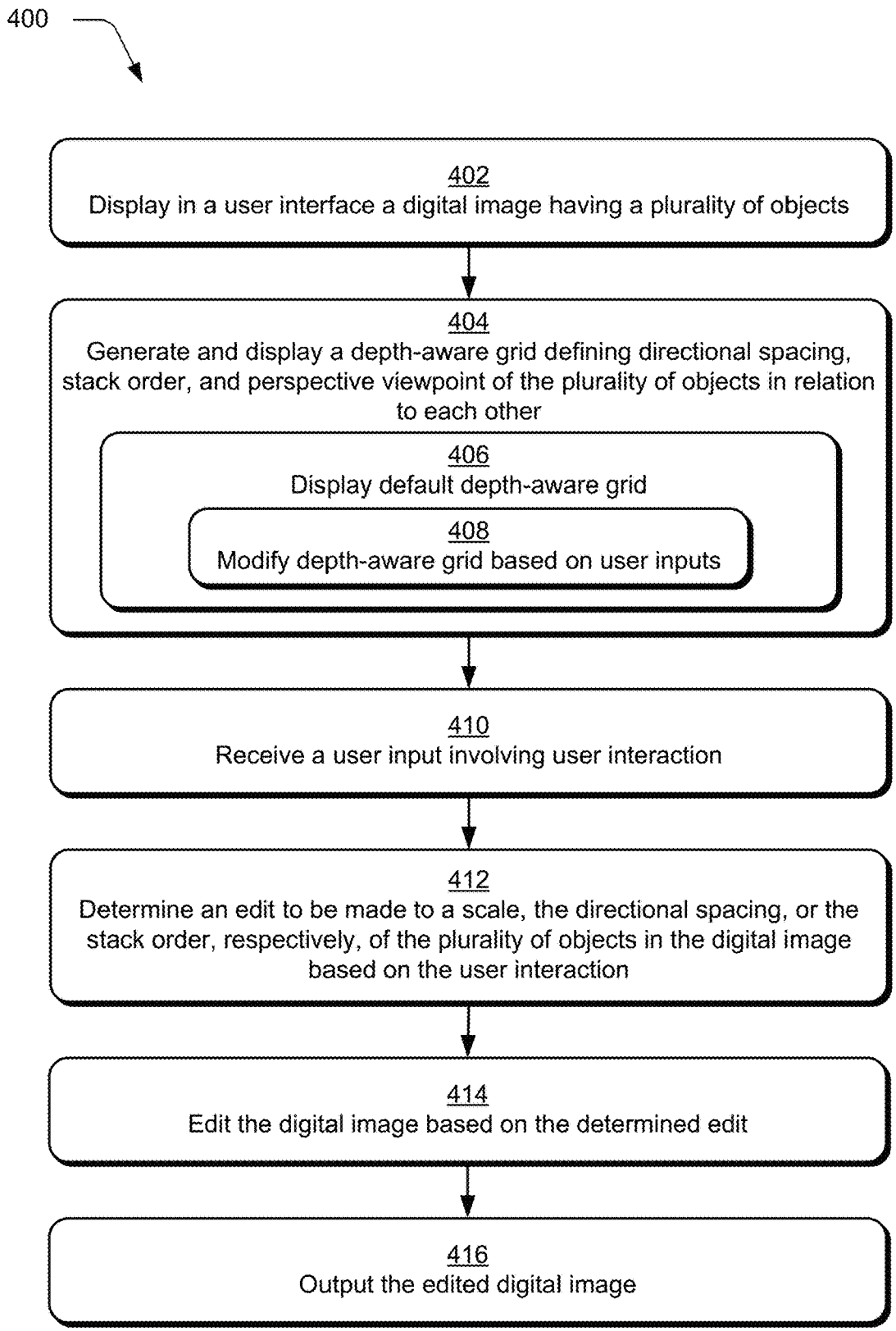

FIG. 2 depicts a system 200 in an example implementation showing operation of the depth-aware system 116 in greater detail as supporting digital image editing through use of a depth-aware grid 120. FIG. 3 depicts an example 300 of output of a default depth-aware grid 120 and modification of the grid responsive to a user input by the depth-aware system 116. FIG. 4 depicts a procedure 400 in an example implementation of digital image editing using the depth-aware system 116.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

To begin in this example, a digital image 106 is displayed in a user interface 110 that includes a plurality of objects 118 (block 402). Objects 118 are configurable in a variety of, examples of which include vector objects, raster objects (i.e., bitmaps), and any other type of digital object capable of being rendered by a computing device.

A depth-aware grid 120 is generated by a grid generation module 202 and displayed in the user interface 110. The depth-aware grid 120 defines directional spacing, stack order, and perspective viewpoint of the plurality of objects 118 in relation to each other (block 404). For example, a default depth-aware grid 120 is displayed responsive to user selection of an option 122 in the user interface 110 of FIG. 1 to initiate output (block 406). As illustrated at a first stage 302 of FIG. 3, a plurality of objects 108 are depicted as icons and the depth-aware grid 120 is displayed "over" these objects 108 in the user interface 110 in a default configuration. Lines used to form the depth-aware grid 120 are user manipulable to change a size and/or perspective viewpoint as further described below.

A user input 204, for instance, is received by the grid generation module 202 to modify the depth-aware grid 120 (block 408), e.g., to change a perspective viewpoint, spacing, rotation, and so on. As illustrated in FIG. 3, the depth-aware grid 120 includes a first and second axis defining a rectangle and lines intersecting the rectangle in the default configuration that are generally perpendicular to each other at the first stage 302.

At the second stage 304, the user input 204 is received to modify the depth-aware grid 120 to change a perspective viewpoint, at which, the grid is oriented to define depth within the digital image 106. As illustrated, the user input 204 is received through use of a cursor control device to move horizontal axis of the depth-aware grid 120 to align with changes in depth exhibited by the objects. This causes creation of a vanishing point 306, at which, lines of the horizontal axis converge to define object depth within the digital image 106. This also defines a perspective viewpoint 308 in relation to the vanishing point 306. Therefore, in this example horizontal lines of the depth-aware grid 120 define depth, however other examples are also contemplated, such as to define depth vertically, define depth using both axis and so forth along any rotation.

The depth-aware grid 120 is then output by the grid generation module 202 for receipt as an input by the depth-aware system 116. The depth-aware system 116 uses the grid as a basis for managing perspective of the objects 108 in the user interface 110 responsive to a user input 206, whether the grid is rendered in the user interface or not. In one example, the depth-aware grid 120 is rendered in the user interface as a guide for editing objects 108 in the digital image 106. In another example, the depth-aware grid 120 is not rendered but is used to determine edits to objects 108 responsive to user inputs, e.g., regarding a change in positioning of the objects 108 and corresponding depths and stack order.

As part of managing perspective, a user input 206 is received by the depth-aware system 116 involving user interaction (block 410) with the depth-aware grid 120 and/or the objects 108. An edit is then determined by the depth-aware system 116 to be made to the directional spacing, the stack order, or scaling of the plurality of objects 118, respectively, in the digital image 106 based on the user interaction (block 412). The digital image 106 is then edited (block 414) and output (block 416). As previously described, the depth-aware grid 120 supports user inputs involving direct interaction with the grid itself as well as direct interaction with the objects 108 in order to manage perspective.

Examples of the supported user interaction and corresponding edits are illustrated as a directional spacing module 208, perspective arrangement module 210, perspective movement module 212 and object redistribution module 214. Directional spacing as implemented by the directional spacing module 208 involves an ability to adjust spacing and/or rotation of the objects 108 as a group responsive to a single input through detected interaction with the depth-aware grid 120. Examples of directional spacing are further described in the Direction Spacing section and illustrated in FIGS. 5-9.

In an editing example implemented by the perspective arrangement module 210, this module is configured to determine and maintain arrangement of objects 108 within the digital image 106 that is consistent with a defined perspective, i.e., perspective viewpoint. This includes constraints implemented by the perspective arrangement module 210 to manage distribution, scale, and/or stack order of the objects 108. Further discussion of this feature is included in the Perspective Arrangement section and depicting in FIGS. 10-17.

In another editing example implemented by a perspective movement module 212, object movement within the digital image 106 from one location to another is managed automatically and without further user intervention to maintain consistency with a defined perspective. For example, movement of an object from one location to another in the digital image that results in a decrease in depth in relation to the perspective viewpoint causes a corresponding increase in scale by the perspective movement module 212 and vice versa. Stack order is also adjusted as appropriate. This is performed be determining a relationship of the positions with respect to the depth-aware grid 120. As a result, user inputs are processed automatically and without user intervention by the perspective movement module 212 to maintain visual consistency, further discussion of which is described in the Perspective Movement section and depicted in FIGS. 18-21.

In a further example, the object redistribution module 214 is configured to adjust objects 108 within the digital image 106 based on changes made to a shape of the depth-aware grid 120. The depth-aware grid 120 as depicted in FIG. 3, for instance, assumes a flat planar configuration. The user input 206 in this instance specifies changes to a curve, shape, angles, and so forth to one or more axis defined by the depth-aware grid 120, which causes a corresponding change to objects 108, e.g., to distribution, scale, stack order, and so forth. In an instance in which the user input 206 changes an axis of the depth-aware grid 120 to incorporate a curve, changes are made to the scale and stack order based on a relative position of the objects 108 in relation to the depth-aware grid 120, e.g., to increase or decrease scale, rearrange the stack order for consistent overlaps, and so forth to follow the curve.

The output of the depth-aware system 116 is then used by an image editing module 216 to generate the edited digital image 218, which is rendered by a rendering module 220 for display in a user interface 110 by a display device 112. As a result, user inputs are processed automatically and without user intervention by the object redistribution module 214 to maintain visual consistency with this change to the depth-aware grid depth-aware grid 120, further discussion of which is described in the Perspective Movement section and depicted in FIGS. 22-24.

Directional Spacing

FIG. 5 depicts a system 500 in an example implementation showing operation of the directional spacing module 208 of the depth-aware system 116 in greater detail. FIGS. 6 and 7 show examples 600, 700 of changes in directional spacing between objects 108 through direct interaction with the depth-aware grid 120. FIG. 8 depicts a procedure 800 in an example implementation of directional spacing based on generation of object translations for objects 108 based on a detected grid translation of the depth-aware grid 120. FIG. 9 depicts an example of a directional spacing algorithm 900.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 5-9.

To begin in this example, a digital image 106 is displayed in a user interface 110 that includes a plurality of objects 108 and a depth-aware grid 120 (block 802). An object listing module 502 is configured to generate an object list 504 of objects 108 included in the digital image 106, such as to progress through vector objects, raster objects, and so on and add these objects to the object list 504. A rotation determination module 506 is also employed to determine a directional axis 508 of the objects 108 based on the depth-aware grid 120 and an axis direction module 510 is implemented to determine angular directions of a first axis 512 and a second ais 415 defined by the depth-aware grid 120.

In the algorithm 900 of FIG. 9, "theta" defines a rotation of the depth-aware grid 120 to define its directional axis, "L" is a list of objects 108 on which the depth-aware grid 120 is invoked. "Alpha" corresponds to the first axis 512 and defines an angular direction of axis "A" (i.e., the first axis 512) and "beta" corresponds to the second axis 514 and defines an angular direction of axis "B," i.e., the second axis 514.

A grid translation determination module 516 is then employed by the depth-aware system 116 to detect a grid translation 518 (block 804) of the depth-aware grid 120. As illustrated in an example 600 of FIG. 6, a first axis 512 is selected at a first location at a first stage 602 and moved (e.g., through a click-and-drag using a cursor control device, gesture, and so forth) to a second location as illustrated at a second stage 604 to expand spacing between objects 108 along the first axis 512. On the other hand, as illustrated in the example 700 of FIG. 7, a second axis 514 is selected at a first location at a first stage 702 and moved (e.g., through a click-and-drag using a cursor control device, gesture, and so forth) to a second location at a second stage 704 to reduce spacing between objects 108 along the second axis 514. Combinations are also contemplated of resizing and user interaction along multiple axis through a single input or multiple user inputs.

An object translation determination module 520 receives the grid translation 518 as an input, and from this, determines object translations 522, respectively, for the plurality of objects 108 in the object list 504 (block 806). The object translation 522 is then used by the image editing module 216 to generate the edit based on the object translations 522 (block 808).

Continuing with the example algorithm 900 of FIG. 9, when a spacing attribute for the first axis 512 is changed by a "P" percentage, e.g., defined from [−100:100], for each object "O" of the plurality of objects 108, a line "L" is determined that passes through a center "C" of object "O" and an angle is determined as "Alpha+90." In order to calculate a new position "C'" of object "O," the new center position is found at line "L" at "X" distance apart from center "C," i.e., the original position of object "O."

A translation transformation "T" is determined as "C-C'" and is applied to object "O" as the object translation 522 to update the position of object "O." This algorithm 900 is then repeated for any detected changes in the second axis 514 and also used as part of edit. In this way, user interaction with the depth-aware grid 120 is utilized to change spacing along first and/or second axis 512, 514 in an intuitive and efficient manner, which may also be performed to incorporate depth as part of perspective arrangement as further described in the following section.

Perspective Arrangement

FIG. 10 depicts a system 1000 in an example implementation showing operation of the perspective arrangement module 210 of the depth-aware system 116 in greater detail. FIGS. 11 and 12 depict examples 1100, 1200 of perspective arrangement of objects 108 through direct interaction with the depth-aware grid 120. FIG. 13 depicts a procedure 1300 in an example implementation of perspective arrangement including perspective distribution, perspective scaling, and perspective stack ordering. FIG. 14 depicts an example of a perspective arrangement algorithm 1400. FIG. 15 depicts an example of a perspective distribution algorithm 1500 of the perspective arrangement algorithm 1400 of FIG. 14. FIG. 16 depicts an example of a perspective scaling algorithm 1600 of the perspective arrangement algorithm 1400 of FIG. 14. FIG. 17 depicts an example of a perspective stack ordering algorithm 1700 of the perspective arrangement algorithm 1400 of FIG. 14.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 10-17.

This example may begin similarity to the previous Directional Spacing example by determining an object list 504, direction axis 508, and directions of a first and second axis 512, 514 from a digital image 106. The depth-aware system 116 then reverse rotates the depth-aware grid 120 and objects 108 (block 1302), e.g., to follow a horizontal and vertical axis of the first and second axis 512, 514, respectively, to ease calculation complexity going forward.

The perspective arrangement module 210, generally, is configured to arrange, scale, and/or order objects 108 in the digital image 106 based on a relationship of the objects 108 to the depth-aware grid 120 that is repositioned to define a change in perspective. This is performed in the following through a combination of distribution, scaling, and stack ordering as shown in an example algorithm 1400 of FIG. 14.

As illustrated in FIG. 11, at a first stage 1102 the depth-aware grid 120 defines a perspective in which depth increases from objects 108 depicted as squares to triangles and to circles that continues to a vanishing point 1104. This is illustrated through a corresponding decrease in scale, respectively, along the depth-aware grid 120. A change to the depth-aware grid 120 that reverses this perspective (i.e., the perspective viewpoint, from which, depth is defined) as illustrated at the second stage 1106 causes the perspective arrangement module 210 to increase scale of the circles and decrease scale of the squares. This results in a perspective in which depth increases from objects 108 depicted as circles to triangles and to squares that continues to a vanishing point 1104. In this example, positions of the objects 108 are not changed but scaling and stack order are changed.

In another example depicted at a first stage 1202 of FIG. 12, the depth-aware grid 120 again defines a perspective in which depth increases from objects 108 depicted as squares to triangles and then to circles and continues on to a vanishing point 1204. In this example, however, the depth-aware grid 120 is manipulated such that locations are also changed in addition to scale, and stack ordering with respect to the vanishing point 1206, automatically and without user intervention. Although this functionality is described as following a particular sequence from distribution to scale to order in the following discussion other sequences are also contemplated.

To do so in the illustrated example of FIG. 10, a perspective distribution module 1002 of the perspective arrangement module 210 calculates an updated object position 1004 based on a translational transformation of the objects 108 (block 1304). As described in in the example algorithm 1500 of FIG. 15, for each object "O" of the plurality of objects 108, a perspective position "C'" is calculated of a center "C" of object "O" in perspective "X," which defines the change to the perspective. The translation transformation 1004 "T" is then calculated as "C-C'" and applied to object "O," which is used to update the position of "O" in the digital image 106 as part of an edit. The updated object position 1004 is then passed as an input to the perspective scaling module 1006.

A perspective scaling module 1006 is then employed to determine an updated object scaling 1008 (block 1306) for the objects 108 based on the updated object position 1004. This is performed, generally, by determining a relative location of the objects 108 in relation to an axis of the depth-aware grid 120 that defines depth in the digital image 106. The depth-aware grid 120, for instance, defines a line segment as a scaling meter for each of the objects 108, which scales up from the vanishing point to an opposing end of the line, and vice versa. Therefore, by taking a center of the objects 108, respectively, as orthogonal to this line defines an amount of scale to be applied. The centers calculated above "stay where they are" in the example to maintain the perspective distribution.

In the example algorithm 1600 of FIG. 16, for each object "O" in the digital image 106, a center "C" is determined and incorporated as part of a vector "V" as "[O,C]." Vectors "V" are sorted based on a horizontal element of center "C" of objects 108 for a first axis 512, e.g., axis "A" and/or sorted based on a vertical element for a second axis 514, e.g., axis "B." A value "L" defines a leftmost center and "V" a vanishing point of the perspective (which defines the perspective viewpoint). The perspective scaling module 1006 then creates a line segment "S" joining these two points at a vertical position which equals a vertical position of the vanishing point. The line is parallel to the first axis 512 and defines a scaling meter for the objects 108.

Accordingly, for each of the objects 108, a value "H'" is calculated by the perspective scaling module 1006 as a horizontal difference of the object center "C" and "V." A value "H" is calculated by the perspective scaling module 1006 as a horizontal difference of "L" and "V." Therefore, a scale value is determined as "H'/H", which is then applied as a percentage to the objects 108 as the updated object scaling 1008.

Based on the updated object position 1004, a perspective stack ordering module 1010 is also employed to determine an updated stack ordering 1012 of the objects 108 (block 1308). To do so as shown in an example algorithm 1700 of FIG. 17, for each object "O" in the digital image 106, a center "C" is determined and incorporated as part of a vector "V" as "[O,C]." A depth-aware sort is then applied to the vectors. For example, the perspective stack ordering module 1010 sorts the vectors "V" from top right to bottom left to support a perspective effect for a depth-aware grid 120 and sort the vector "V" based on a horizontal element of center "C" of objects for the first axis 512 i.e., axis "A," in decreasing order, and also sorts based on a vertical element for the second axis 514, i.e., axis "B." In case of a same horizontal element, the sort is based on a vertical element in increasing order. From the sorted vectors "V" of the objects 108 and based on a corresponding position of center "C," the object hierarchy is recorded by keeping a "front" object at the bottom and each subsequent object above it in stack order to define the updated stack ordering 1012.

The output of the perspective arrangement module 210 is then used by an image editing module 216 to generate the edited digital image 218. The objects 108 in the digital image 106 are edited based on the translation, scaling, and stack ordering (block 1310) and the depth-aware grid 120 is reverse rotated (block 1312) and the edited digital image is output (block 1314). As a result, position, scale, and stack ordering of the objects 108 remains consistent with respect to changes in perspective, e.g., cause by interaction with the depth-aware grid 120. Other examples are also contemplated, such as edits involving direct user interaction with the objects 108 themselves as further described in the following section.

Perspective Movement

FIG. 18 depicts a system 1800 in an example implementation showing operation of the perspective movement module 212 of the depth-aware system 116 in greater detail. FIG. 19 depicts an example 1900 of perspective movement of an objects through direct interaction with the object. FIG. 20 depicts an example of a perspective movement algorithm 2000. FIG. 21 depicts an example of a depth aware sort algorithm 2100 of the perspective movement algorithm 2000 of FIG. 20.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 18-21.

In this example, direction interaction with the objects 108 is detected, which is then used to detect an updated object position, updated object scaling, and updated stack ordering, where appropriate. For example, as illustrated in FIG. 19 at a first stage 1902, an object 1904 depicted as a building is selected and repositioned. The new position involves a change in translation as well as a change in depth and thus scaling and stack ordering as shown at the second stage 1906. Accordingly, functionality of the perspective movement module 212 is similar to that of the perspective arrangement module 210 as described in the previous section, but rather than applied to each of the objects 108 is applied to the object being moved.

As illustrated in the system 1800 of FIG. 18, a perspective distribution module 1802 is configured to detect an updated object position 1804 of the object being moved. Based on this, an update object scaling 1808 is calculated by a perspective scaling module 1806. A perspective stack ordering module 1810 is also employed to generate an updated stack ordering 1812 based on the updated object position 1804, and more particularly a depth associated with the position. This is performed in this example through use of a depth aware sorting module 1814 which applies a binary sort to reorder the objects 108. The output of the perspective movement module 212 is then used by an image editing module 216 to generate the edited digital image 218.

As depicting in the algorithm 2000 of FIG. 20 as implemented by the perspective movement module 212, "S" defines a particular one of the objects 108 being moved in the user interface 110, e.g., responsive to a user input via a cursor control device, gesture, spoken utterance, and so forth. "E" defines other ones of the objects 108 that are not being moved in the digital image 106. As before, "theta" defines a rotation of the depth-aware grid 120 to define its directional axis. The depth-aware grid 120 and objects 108 are reverse rotated as before to simply calculations.

A sorted vector "V" is generated as previously described that sorts based on a center order. A value "Cp" is calculated by the perspective movement module 212 for each new input position of "S," the object being moved. As the object "S" is being moved, the perspective movement module 212 updates the stack ordering and scale in real time to support real time output. As part of this, a depth aware sort is performed by the depth aware sorting module 1814.

An example of this is illustrated in the algorithm 2100 of FIG. 21. A binary search for the "Cp" in vector "V" is performed to determine an upper bound object. The object "S" is then reordered in the stack order "below" the other object associated with the upper bound to give a correct sense of depth. In this way, the depth-aware system 116 supports real time user interaction directly with the objects 108 to adjust scale and stack ordering based on movement of the objects across different translations and depths. Further, in this example the depth-aware grid 120 is not rendered in the user interface 110 yet is still usable to define depth and perspective of objects 108 within the digital image 106. Additional examples are also contemplated, including support of user inputs to adjust a shape of the depth-aware grid 120 as further described in the following section.

Object Redistribution

FIG. 22 depicts an example 2200 of object redistribution responsive to an edit made to a shape o the depth-aware grid 120. FIG. 23 depicts an example of a preprocessing algorithm 2300 for object redistribution. FIG. 24 depicts an example grid editing algorithm 2400.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 22-24.

In the previous example, the depth-aware grid 120 defines a flat planar shape that is used to define perspective and depth of objects 108 in the digital image 106. Other examples are also supported, including changes to a shape of the depth-aware grid 120, such as to incorporate curves, angles, and so on which are also usable to define depth and perspective of objects 108 as described above.

Consider the illustrated example of FIG. 22, at a first stage 2202, objects 108 are depicted as the same size and same depth (and therefore have same scale) within a digital image 106 output by a user interface 110.

Example System and Device

FIG. 25 illustrates an example system generally at 2500 that includes an example computing device 2502 that is representative of one or more computing systems and/or devices that may implement the various techniques described herein. This is illustrated through inclusion of the depth-aware system 116. The computing device 2502 may be, for example, a server of a service provider, a device associated with a client (e.g., a client device), an on-chip system, and/or any other suitable computing device or computing system.

The example computing device 2502 as illustrated includes a processing system 2504, one or more computer-readable media 2506, and one or more I/O interface 2508 that are communicatively coupled, one to another. Although not shown, the computing device 2502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2504 is representative of functionality to perform one or more operations using hardware. Accordingly, the processing system 2504 is illustrated as including hardware element 2510 that may be configured as processors, functional blocks, and so forth. This may include implementation in hardware as an application specific integrated circuit or other logic device formed using one or more semiconductors. The hardware elements 2510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2506 is illustrated as including memory/storage 2512. The memory/storage 2512 represents memory/storage capacity associated with one or more computer-readable media. The memory/storage component 2512 may include volatile media (such as random access memory (RAM)) and/or nonvolatile media (such as read only memory (ROM), Flash memory, optical disks, magnetic disks, and so forth). The memory/storage component 2512 may include fixed media (e.g., RAM, ROM, a fixed hard drive, and so on) as well as removable media (e.g., Flash memory, a removable hard drive, an optical disc, and so forth). The computer-readable media 2506 may be configured in a variety of other ways as further described below.

Input/output interface(s) 2508 are representative of functionality to allow a user to enter commands and information to computing device 2502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2510 and computer-readable media 2506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2510. The computing device 2502 may be configured to implement particular instructions and/or functions corresponding to the software and/or hardware modules. Accordingly, implementation of a module that is executable by the computing device 2502 as software may be achieved at least partially in hardware, e.g., through use of computer-readable storage media and/or hardware elements 2510 of the processing system 2504. The instructions and/or functions may be executable/operable by one or more articles of manufacture (for example, one or more computing devices 2502 and/or processing systems 2504) to implement techniques, modules, and examples described herein.

The techniques described herein may be supported by various configurations of the computing device 2502 and are not limited to the specific examples of the techniques described herein. This functionality may also be implemented all or in part through use of a distributed system, such as over a "cloud" 2514 via a platform 2516 as described below.

The cloud 2514 includes and/or is representative of a platform 2516 for resources 2518. The platform 2516 abstracts underlying functionality of hardware (e.g., servers) and software resources of the cloud 2514. The resources 2518 may include applications and/or data that can be utilized while computer processing is executed on servers that are remote from the computing device 2502. Resources 2518 can also include services provided over the Internet and/or through a subscriber network, such as a cellular or Wi-Fi network.

The platform 2516 may abstract resources and functions to connect the computing device 2502 with other computing devices. The platform 2516 may also serve to abstract scaling of resources to provide a corresponding level of scale to encountered demand for the resources 2518 that are implemented via the platform 2516. Accordingly, in an interconnected device embodiment, implementation of functionality described herein may be distributed throughout the system 2500. For example, the functionality may be implemented in part on the computing device 2502 as well as via the platform 2516 that abstracts the functionality of the cloud 2514.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:
1. A method comprising:
   displaying, by a processing device, a digital image having a plurality of digital objects in a user interface;

displaying, by the processing device, a depth-aware grid in the user interface over the digital image, the depth-aware grid defining constraints to spacing, depth, scale, stack order, and a perspective of the plurality of digital objects and having an axis corresponding to a location of a vanishing point;

receiving, by the processing device, one or more inputs including:

a change to the location of the vanishing point via user interaction with the axis of the depth-aware grid; and a size change of the depth-aware grid via user interaction with the depth-aware grid;

editing, by the processing device, the plurality of digital objects to have:

an updated perspective based on the change to the location of the vanishing point;

a spacing change to the plurality of digital objects based on the size change of the depth-aware grid and the updated perspective; and a change to at least one of the scale or the stack order based on the updated perspective; and outputting, by the processing device, a result of the editing of the plurality of digital objects in the digital image for display in the user interface.

2. The method of claim 1, wherein the digital image and the plurality of digital objects are two-dimensional.

3. The method of claim 1, wherein the one or more inputs involve changing directional spacing of the plurality of digital objects based on a grid translation of the axis of the depth-aware grid.

4. The method of claim 3, wherein the editing the plurality of digital objects includes determining amounts and directions of digital object translations for the plurality of digital objects based on the grid translation.

5. The method of claim 3, wherein the grid translation causes the size change of the depth-aware grid along the axis of the depth-aware grid.

6. The method of claim 1, wherein the axis of the depth-aware grid defines the vanishing point at which lines of the depth-aware grid converge.

7. The method of claim 1, further comprising:

receiving, by the processing device, an input to configure at least one axis of the depth-aware grid to include a curve; and configuring, by the processing device, the scale, the spacing, and the stack order of the plurality of digital objects based on the curve to have a depth that increases or decreases based on the curve.

8. The method of claim 1, wherein the axis of the depth-aware grid defines amounts of scale that increase as corresponding to increases in distance along the axis from the vanishing point.

9. A non-transitory computer-readable storage medium storing executable instructions that, responsive to execution by a processing device, causes the processing device to perform operations comprising:

displaying a digital image having a plurality of digital objects in a user interface;

displaying a depth-aware grid in the user interface over the digital image, the depth-aware grid defining constraints to spacing, depth, scale, stack order, and a perspective of the plurality of digital objects and having an axis corresponding to a location of a vanishing point;

receiving one or more inputs including:

a change to the location of the vanishing point via user interaction with the axis of the depth-aware grid; and a size change of the depth-aware grid via user interaction with the depth-aware grid;

editing the plurality of digital objects to have:

an updated perspective based on the change to the location of the vanishing point;

a spacing change to the plurality of digital objects based on the size change of the depth-aware grid and the updated perspective; and a change to at least one of the depth, the scale, or the stack order based on the updated perspective; and outputting a result of the editing of the plurality of digital objects in the digital image for display in the user interface.

10. The non-transitory computer-readable storage medium of claim 9, wherein the digital image and the plurality of digital objects are two-dimensional.

11. The non-transitory computer-readable storage medium of claim 9, wherein the one or more inputs involve changing directional spacing of the plurality of digital objects based on a grid translation of the axis of the depth-aware grid.

12. The non-transitory computer-readable storage medium of claim 11, wherein the editing the plurality of digital objects includes determining amounts and directions of digital object translations for the plurality of digital objects based on the grid translation.

13. The non-transitory computer-readable storage medium of claim 11, wherein the grid translation causes the size change of the depth-aware grid along the axis of the depth-aware grid.

14. The non-transitory computer-readable storage medium of claim 9, wherein the axis of the depth-aware grid defines the vanishing point at which lines of the depth-aware grid converge.

15. The non-transitory computer-readable storage medium of claim 9, wherein at least one axis of the depth-aware grid defines amounts of scale that increase as corresponding to increases in distance along the at least one axis from the vanishing point.

16. A system comprising:

a processing device; and a computer-readable storage medium storing instructions that, responsive to execution by the processing device, causes the processing device to perform operations including:

displaying a digital image having a plurality of digital objects in a user interface;

displaying a depth-aware grid in the user interface over the digital image, the depth-aware grid defining constraints to spacing, depth, scale, stack order, and a perspective of the plurality of digital objects and having an axis corresponding to a location of a vanishing point;

receiving one or more inputs including:

a change to the location of the vanishing point via user interaction with the axis of the depth-aware grid; and a size change of the depth-aware grid via user interaction with the depth-aware grid; editing the plurality of digital objects to have:

an updated perspective based on the change to the location of the vanishing point;

a spacing change to the plurality of digital objects based on the size change of the depth-aware grid and the updated perspective; and a change to at least one of the depth, the scale, or the stack order based on the updated perspective; and outputting a result of the editing of the plurality of digital objects in the digital image for display in the user interface.

17. The system of claim 16, wherein the digital image and the plurality of digital objects are two-dimensional.

18. The system of claim 16, wherein the one or more inputs involve changing directional spacing of the plurality of digital objects based on a grid translation of the axis of the depth-aware grid.

19. The system of claim 18, wherein the editing the plurality of digital objects includes determining amounts and directions of digital object translations for the plurality of digital objects based on the grid translation.

20. The system of claim 18, wherein the grid translation causes the size change of the depth-aware grid along the axis of the depth-aware grid.

\* \* \* \* \*